Jan. 19, 1943. C. F. PEASE 2,309,008
VENDING MACHINE
Filed Nov. 7, 1940 6 Sheets-Sheet 3

INVENTOR.
Charles F. Pease.
BY
ATTORNEY.

Jan. 19, 1943.  C. F. PEASE  2,309,008
VENDING MACHINE
Filed Nov. 7, 1940   6 Sheets-Sheet 4

INVENTOR.
Charles F. Pease,
BY
ATTORNEY.

Jan. 19, 1943.　　　C. F. PEASE　　　2,309,008
VENDING MACHINE
Filed Nov. 7, 1940　　　6 Sheets-Sheet 5

Fig. 9.

INVENTOR.
Charles F. Pease
BY
ATTORNEY.

Jan. 19, 1943.　　　　　C. F. PEASE　　　　　2,309,008
VENDING MACHINE
Filed Nov. 7, 1940　　　　6 Sheets-Sheet 6

INVENTOR.
Charles F. Pease
BY
ATTORNEY.

Patented Jan. 19, 1943

2,309,008

UNITED STATES PATENT OFFICE 2,309,008

VENDING MACHINE

Charles F. Pease, Pasadena, Calif.

Application November 7, 1940, Serial No. 364,621

10 Claims. (Cl. 312—96)

My invention relates to improvements in vending machines of that type which is particularly adapted to vend oblong objects such as packages of gum, candy and other commodities or other articles and which further is adapted to be controlled by a suitable coin operated apparatus, one form of which is the subject matter of a companion application for patent about to be filed.

One of the advantages attained by my improved apparatus is that the article which is purchased by and released to the vendee is displayed in full view in the machine while remaining articles in the magazine are obscured from view. In this manner the operator sees the article which he purchases before and as he operates the machine. Another advantage is that the machine is adjustable so that it can easily be made to vend articles of various sizes such as in length, breadth and thickness. Another advantage is that in reloading the machine articles left over can be made to vend first so that old or nearly stale articles are dispensed before the freshly loaded articles are reached for distribution. Another advantage is that the machine is not subject to jamming, pilfering or "milking." A further advantage is that the improved construction provided by my invention facilitates the easy assemblage of a number of my improved vending units in a cabinet so as to vend several different kinds of articles and so as to be controlled by a single coin controlled unit. Among still further advantages are greater simplicity of construction and effectiveness in use than with vending machines heretofore produced.

In the accompanying drawings forming part of this specification.

Figure 4:
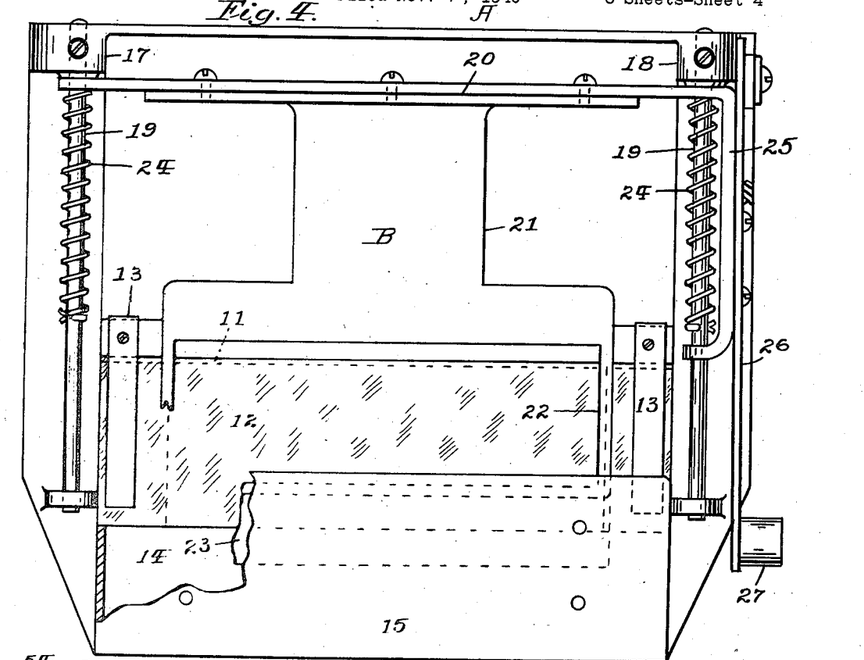
Fig. 4 is an inside front elevational view of that portion of the machine which is taken in a plane indicated by the line 4—4 of Fig. 3, when the parts of the frame are separated.

The drawings show my improved vending machine unit applied to the front panel 10 of a vending machine cabinet (not shown), in which a number of vending machine units may when desired be assembled to vend several different kinds of articles from a single cabinet, said units being adapted to be controlled by suitable coin controlled apparatus, one improved form of which is the subject matter of a companion application about to be filed. My improved vending machine unit is provided with a face plate frame A, which has a horizontal oblong window opening 11 in its lower portion, closed by the transparent plate 12 made out of glass or other suitable transparent material. This transparent plate is shown clamped in its frame by the clips 13 (see Fig. 4). The lower end of the face plate frame is formed with a pocket 14 which terminates forwardly in a mouth 15, said mouth being closed by a hinged cover 16 and acting to deliver each article vended by the machine to the vendee. The upper and lower ends of the face plate frame are formed with pairs of rearwardly projecting bosses 17 and 18 in which a pair of vertical laterally spaced guide rods 19 are secured. These rods act as vertical guides for directing the vertical movement of a reciprocable gate B.

The gate B is formed with a horizontal yoke 20 on its upper end, a vertical body web 21 and an article receiving hopper or holder 22 on its lower end, the latter being formed with a forwardly and downwardly extending chute or floor 23. This hopper is adapted to hold and display each article to be vended through the sight opening 11 in the normal (superior) position of the gate, and by its chute deposit the article into the mouth 15 as the gate lowers into lowermost position. Each guide rod 19 is provided with a helical expansion spring 24. These springs serve to return the gate into normal position automatically but permit the gate sliding downwardly into lowermost position. The sliding movement is equalized by the downwardly extending guide arm 25 which embraces one of the guide rods 19 below its companion spring 24. The equalizing arm 25 has rigidly secured thereto the depending drive arm 26. On the lower end of this arm is the antifriction actuating pinion roller 27 by which the gate is propelled downwardly and released upwardly into normal position. In other words the pinion roller 27 is actuated so as to cause the gate member to reciprocate, a complete up and down stroke occurring each time an article is disbursed from the machine as will be hereinafter explained.

To the back of the pocket portion 14 of the face plate frame is secured by any suitable means, such as the screws 30, a horizontal skeleton bracket 31 having a horizontal main table 32, to the surface of which is fastened a pair of laterally spaced angle members 33 and 34. These angle members have parallel longitudinal vertical sides 35 and horizontal clamping base members 36, the latter being secured by clamping screws 37 through laterally extending slots 38 to the table so that the angle members are adjustable laterally apart in parallel relation. The angle members 33 and 34 are employed to support a pair of inwardly facing longitudinal guide channel members 39 and 40, in vertically selected position, the latter being accomplished through the use of the clamping screws 41 and vertical slots 42 in the vertical sides 35 of the angle members. Said channel members are employed to support the magazine C at suitable elevation to feed articles therein as they are dispensed successively from the machine. The height at which the magazine is supported is determined by the thickness of the articles which are vended. Sufficient height should be provided so that the entire lower layer of articles in the magazine is fed forwardly step by step by the feed belt E.

Figure 2:
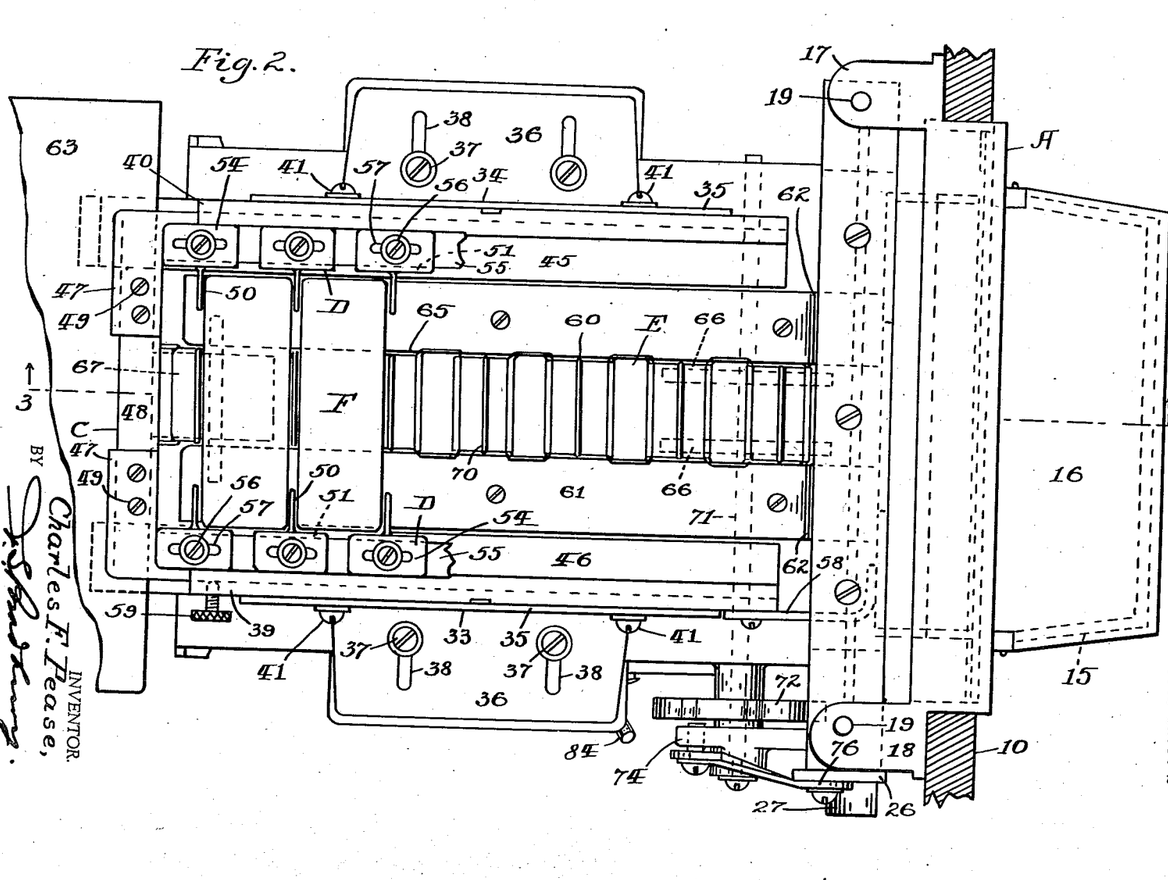
Fig. 2 is a plan of the invention.
Figures 5, 6, 7, 8:
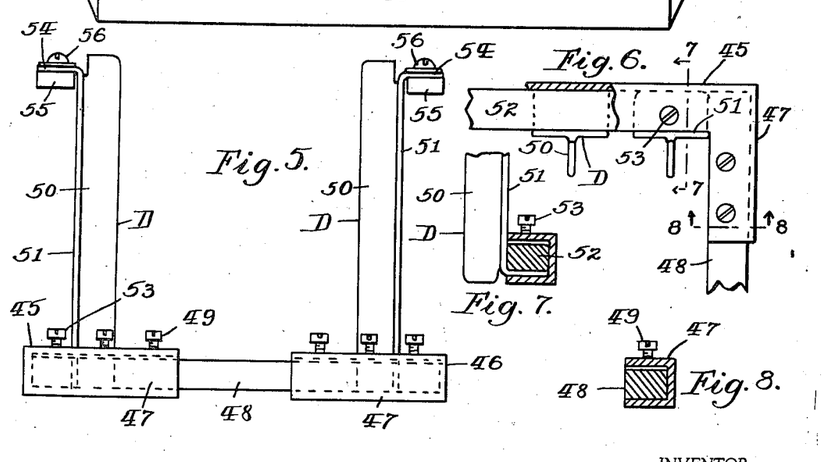
Fig. 5 is an end elevation of the magazine or crate which holds the articles to be vended in the machine.
Fig. 6 is a plan, partly broken away, of a detail portion of the machine.
Fig. 7 is a section taken on the line 7—7 of Fig. 6.
Fig. 8 is a section taken on line 8—8 of Fig. 6.

The magazine C has a rectangular base formed with a pair of channel sides 45 and 46 opening inwardly, each side having end members 47. Transverse end bars 48 are clamped in the channels of the end members by clamping screws 49 so that the sides are adjustable as to width to accommodate any length of article to be dispensed which is held in the magazine. Supported by the base frame of the magazine are a plurality of vertical spacers D, which are arranged in transverse pairs, the members of each pair being arranged opposite one another. Each spacer resembles a T in cross section, the cross arm member 51 thereof being struck outwardly at its lower end into the bottom of one of the channels as shown in Fig. 7, below a clamping bar 52, which in turn is clamped rigidly in the side channel member by screws 53 to hold the spacers in longitudinal adjusted position. The upper end of the cross arm member 51 of the spacer is struck outwardly into a flange 54 and is secured to a longitudinal bar 55 by a screw 56 passing through a longitudinal slot 57 in said flange to permit the spacers being adjusted apart and accommodate articles to be vended of any desired width. The web of each T-shaped spacer forms a vertical transverse blade 50 and the blades of each pair of spacers are positioned opposite each other thus in cooperation with the bars of each spacer forming vertical skeleton channels in which the oblong shaped articles such as packages F, of gum, candy, etc., can be arranged in vertical tiers, the tiers being arranged in a longitudinal row approaching the back of the face plate A. The magazine is slid longitudinally with the sides 45 and 46 of its frame into the channel members 39 and 40, its inward sliding movement being limited by a stop 58 (see Fig. 2) which prevents the magazine from interfering with the reciprocable movement of gate B. When adjusted as desired it is clamped in fixed position by the set screw 59.

The table 32 of the bracket is provided with a pair of horizontal laterally spaced slide plates 60 and 61, which extend longitudinally below the magazine and terminate forwardly near the gate in downwardly slanting skids 62, which register above the rearward upper end of the chute 23 in the bottom of the hopper 22 of the gate B. When articles such as F to be vended are placed in the article holding spaces or channels in the magazine the lowermost member of each tier rests with the ends of its lower side upon the slide plates 60 and 61, free from the lower side of the base frame of the magazine so as to slide forwardly step by step the width of one of the articles to be deposited one at a time in the hopper of the gate. Loading of the magazine is facilitated by the end auxiliary table 63 which is detachably supported by the end projecting hook members 64 on the frame of the machine. This table is arranged so that the magazine can be slid from within the structure into fully exposed position without disturbing the contents thereof.

Figure 3:
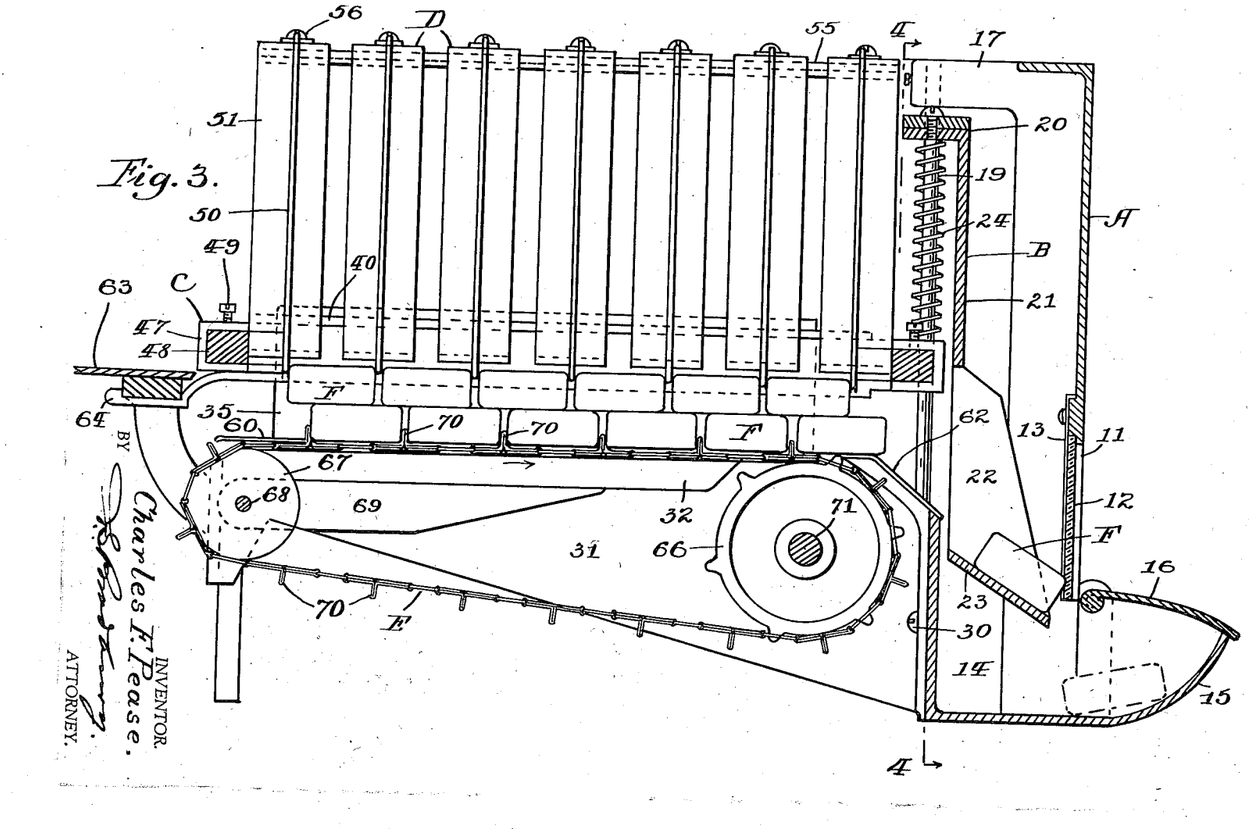
Fig. 3 is a longitudinal central section taken approximately on line 3—3 of Fig. 2.

The bracket 31 is sufficiently open to admit a link belt E. This belt travels around the pair of drive sprockets 66 near the forward end of the bracket 31 and the idle pulley 67 which is journaled by its shaft 68 in the pair of longitudinal flanges 69 depending from the lower side of the rearward portion of the table 32. The upper side of the belt travels upon the table 32 towards the gate B. The links of the belt are provided with suitable outstanding transverse propelling blades 70 which are spaced apart between each adjacent pair sufficiently to freely receive each of the articles F to be vended from the magazine. The spacers D are preferably spaced with their vertical transverse blades 50 apart at a distance approximately corresponding with the spaced distance between the transverse blades of the belt. This spacing need not be accurately arranged so long as the spacing blades of the belt and spacers substantially correspond near the gate. Normally, that is when the parts of the machine are at rest after each stroke, the pairs of adjacent blades of the links on the upper side of the belt, at the forward end of the machine, approximately register below and opposite the lower ends of the forward pair of spacers D of the magazine. In Fig. 3 it will be noted the belt has traveled forwardly part way during the forward half of a complete stroke and the entire lower layer of articles has been slid forwardly on the slide plates 60 and 61. The article previously deposited in the hopper of the gate is about to be released into the mouth 15 by further lowering of the gate.

Figure 1:
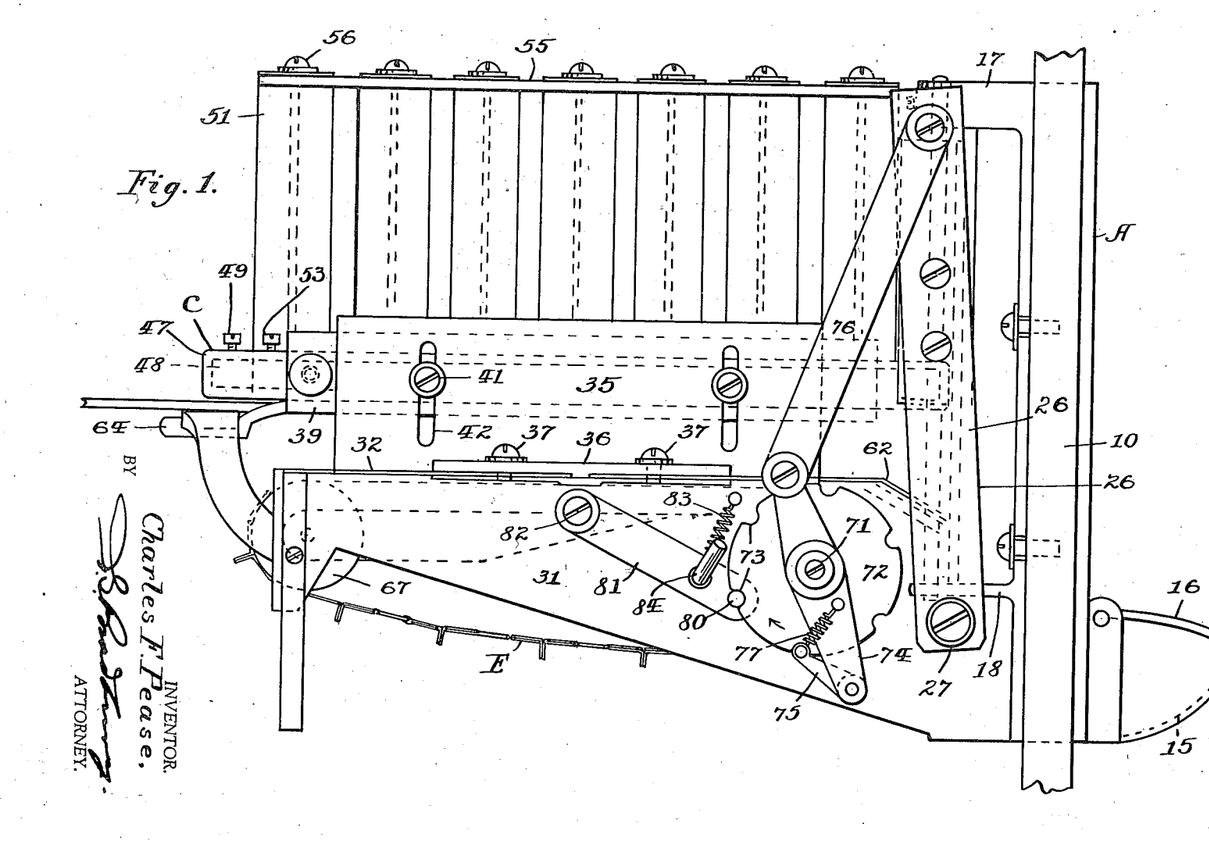
Fig. 1 is a side elevation of my improved vending machine.

Suitable actuating mechanism, as follows is provided for revolving the feed belt E step by step to feed one of the articles F at a time from the gate into the mouth during each forward down stroke of the drive member 26 and from the magazine into the gate as the latter approaches the upper end of the return up stroke. Sprockets 66 which drive the chain belt are rigidly mounted upon the drive shaft 71, which in turn is journaled in the bracket 31. On the outer end of this shaft is rigidly secured a ratchet wheel 72 having shoulder forming indentures 73 in its perimeter, spaced to correspond with the pitch of the chain required to feed an article F from the magazine each operation of the machine. Journaled freely upon the shaft 71 adjacent to the ratchet wheel is a double lever pawl supporting rocker arm 74. On the outer end of one member of this rocker arm is pivoted, a pawl 75. On the outer end of the opposite member of said rocker arm is pivotally secured one end of a pitman rod 76. The remaining end of the pitman rod is pivotally secured to the upper end of the drive rod 26 which actuates the gate. Thus as the drive arm is thrust up and down the rocker arm 74 is caused to reciprocate on the drive shaft 71. The free end of the pawl 75 is suitably shaped and pressed inwardly by retractile spring 77 (see Fig. 1) to engage successively in the indentures 73, in the ratchet wheel, and revolve the ratchet wheel 72 step by step forwardly, in the direction of the arrow shown in Fig. 1, during each return stroke upwardly of the drive arm 26 and to sweep over the perimeter and into engagement with a succeeding indenture in the ratchet wheel during each forward down stroke of said drive arm. As the drive arm is released at the lower end of the down stroke the springs 24 tend to return the gate B into superior position and move the feed belt E a complete step forwardly sufficient to deposit an article from the magazine C into the hopper 22 of the gate. During the down stroke of the drive arm 26 a spring pressed stop 89 engages one of the indentures in the ratchet wheel to lock the wheel and prevent rotation during the down stroke of the drive arm. This stop is mounted upon the swinging arm 81 which is pivoted at 82 on the side of the bracket and swung with the stop 89 into ratchet engaging position by the retractile spring 83 (see Fig. 1). A block pin 84, intermediate the ends of the arm 81 and in the patch of the upper end of the rocker arm 74 causes the stop to release from engagement with the ratchet wheel at the lower portion of the down stroke of the drive arm 26 and ride freely upon the periphery of the ratchet wheel during the entire return up stroke, whereupon the stop again engages and positively locks the ratchet wheel and its connected feed mechanism from movement. In this position the parts of the mechanism are obstructed from tampering with the mechanism.

Figure 9:
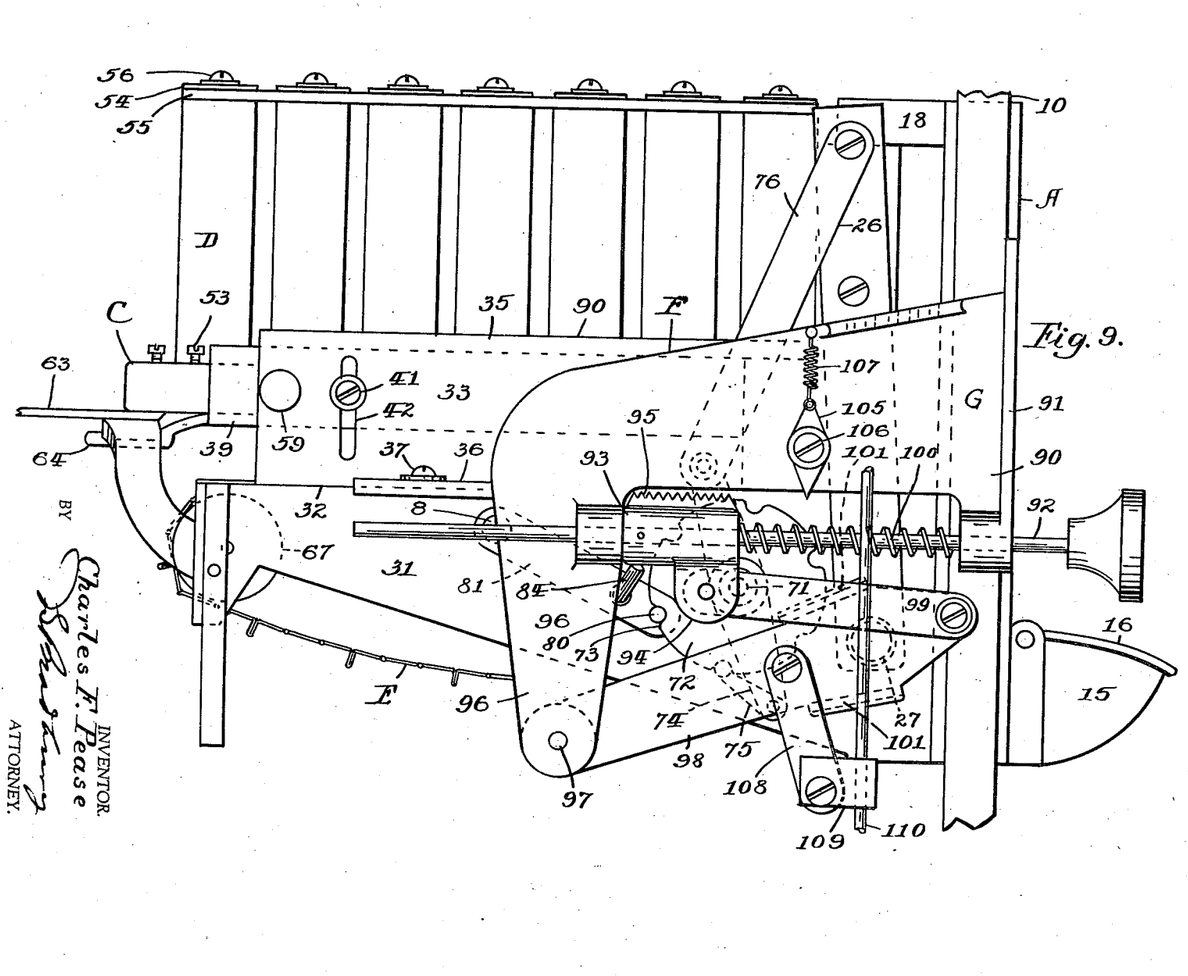
Fig. 9 is a side elevation of the hand operable actuator by which the vending apparatus is propelled, said actuator being shown in cooperation with the impelling member of the vending apparatus.
Figure 10:
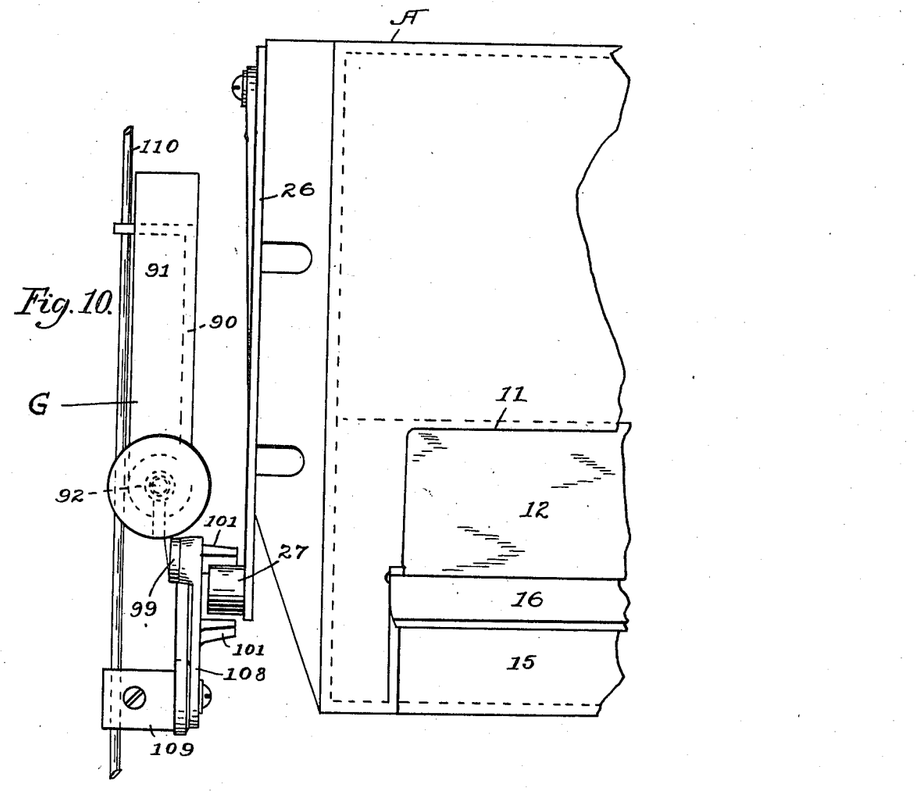
Fig. 10 is a front elevation of the hand operable actuator applied to the vending apparatus, a portion only of the latter being shown.
Figure 11:
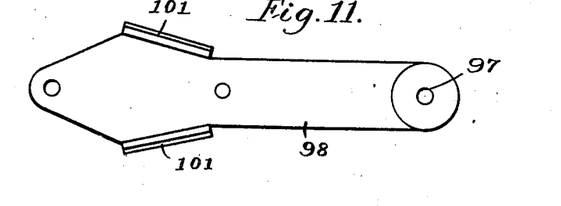
Fig. 11 is a side elevation of the impeller arm of the actuator, which connects with and engages the impeller on the vending apparatus.

A suitable manually operable actuator, such as G (see Figs. 9, 10 and 11) for controlling the operation of the drive arm 26 is provided, which is adapted to be coin controlled when desired, the particular coin controlled mechanism employed not being shown and forming the subject matter of a companion application for patent. The actuator G consists as follows: A suitable frame 90 is provided which is adapted to be assembled in a cabinet (not shown) containing the vending apparatus, and secured by a face member 91 to a panel indicated by 10 forming part thereof. Reciprocable in and out of the cabinet is a pull rod 92, which slidably supports a collet block 93, on the lower side of which is a boss 94 and on the upper side a longitudinal series of ratchet teeth 95. The frame has a depending inner arm 96, to the lower extending portion of which is pivoted at 97 an actuating lever 98, the free end of which is pivotally hung from the boss 94 by a link 99 so that as the pull rod is reciprocated longitudinally, the actuating lever is swung up and down. An expansion spring 100 is threaded over the shank of the pull rod between the outer portion of the frame and the collet block 93. This spring permits the pull rod to be projected outwardly and swing the actuating lever downwardly and serves to return the pull rod inwardly and swing the actuating lever back into superior position. The actuating lever is provided with a pair of shoulders 101 spaced vertically apart sufficient to admit and engage the antifriction actuating pinion roller 27 on the drive arm 26 to propel the latter, thus reciprocating the gate and rocker arm 74. In mounting the parts on the cabinet the actuator is positioned so that the shoulders 101 cooperate with the actuating roller 27 and cause the functioning of the vending apparatus in the manner described.

To cause a complete forward and return stroke being made during each operation of the machine a double acting spring pressed pawl 105 is freely pivoted at 106 on the frame of the actuator so as to contact the ratchet teeth 95 on the sliding collet block 93 as the pull rod is reciprocated in either direction. This pawl is retained in normal position out of contact with the teeth when the pull rod is in receded position by a helical retractile spring 107. As the pull rod is withdrawn the pawl sweeps over the teeth and acts as a stop to prevent any return movement until a complete forward stroke has been made and vice versa, after complete withdrawal movement has been made and the pull rod retracts back into the machine the pawl again sweeps over the teeth and prevents any reversal until a complete backward stroke has been made. In this manner "jamming" by improper operation and "milking" by thieves, of the machine are prevented. The actuating lever 98 is shown connected by a link 108 and clamp block 109 to the control rod 110 of a coin control apparatus (not shown) by which the operation of the vending machine actuator may be controlled in the usual manner through the dropping of a coin in a slot.

In operation the frame of the magazine and the spacers therein are first adjusted to accommodate the size of the article to be dispensed as to their length and breadth. After being loaded with the articles the magazine is slid into the channel members 39 and 40 and secured in adjusted position by the set screw 59, care being taken to position the innermost tier of articles with its lowermost member in engagement resting upon the slides 60 and 61 between the corresponding pair of blades 70 of the link belt E. The height at which the channel members are supported should also be regulated by the screw and slotted connections 41 and 42 so that sufficient space is provided between the lower ends of the spacers in the magazine frame and slides 60 and 61 to permit only the lower row of articles being propelled forwardly by the feeder belt E while the spacers hold the remaining load of articles stationary. By pulling the actuating rod 92 against the tension of its spring 100 into outermost position the gate B is thrust down, thus releasing the article previously placed in its hopper into the delivery mouth 15, the web 21 of the gate acting as a stop to block the entrance of a succeeding article in the machine from entering the gate. Immediately upon releasing the pull member 92 the springs 24 return the gate into superior position and revolve the feed belt E a step forwardly whereby a succeeding article is released from the magazine and deposited into the gate where it is exhibited through the window opening 11 in the face member of the machine. The actuating mechanism by which the feed belt E is stepped forwardly a suitable distance each operation to feed a single article forwardly from the magazine is regulated by the proper diameter and spacing of the ratchet assembly employed. During the operation of the pull member 92 by which the machine is caused to function the double acting ratchet pawl compels a complete outward stroke of the pull member and a complete return stroke without any intermediate reversal, thus avoiding any possibility of misuse or "milking" of the machine.

In accordance with the patent statutes, I have described the principles of operation of my invention together with the apparatus which I now consider to represent the best embodiment thereof but I desire to have it understood that the construction shown is only illustrative and that the invention can be carried out by other means and applied to uses other than those above set forth within the scope of the following claims.

I claim:

1. A vending machine, comprising, in combination, a face member having a delivery mouth in its lower portion, a gate reciprocable vertically in said face member having a hopper adapted to receive and hold an article to be dispensed when in superior position and to register with and release said article into said mouth when lowered, a manual control for depressing said gate, spring propelling means for returning the gate to superior position, a magazine for holding articles to be vended adjacent to said gate, means for feeding articles from said magazine into said hopper, spring propulsion for actuating said feeding means, and a connection between said manual control and said feeding means by which the latter is caused to feed a single article at a time into said hopper as said gate returns to normal position.

2. A vending machine, comprising, in combination, a face member having a delivery mouth, a gate reciprocable vertically in said face member having a hopper adapted to receive and hold an article to be dispensed when in superior position and to register with and release said article into said mouth when lowered, a manual control for depressing said gate, spring propelled means for returning said gate to superior position, a magazine for holding articles to be dispensed in proximity to said gate, an endless belt supported by said magazine having propelling blades adapted to engage and feed articles from the magazine into said hopper, and means activated by said manual control for causing the movement of said belt whereby an article at a time is delivered from the magazine into said hopper each time said gate returns into superior position.

3. A vending machine, comprising, a face member having a delivery mouth and sight opening, a gate reciprocable up and down in said face member having a hopper adapted to receive and hold an article to be dispensed in full view through said sight opening when in superior position and to register with and release said article into said mouth when lowered, a manual control for depressing said gate, spring propelled means for returning said gate into elevated position, a magazine for holding articles to be dispensed in proximity to said gate, a feeding element supported by said magazine having propelling blades adapted to engage and feed articles from the magazine into said hopper, and ratchet means connected with and operated by the movement of said gate for actuating said feeding element whereby a single article from the magazine is fed into said hopper as said gate returns to superior position.

4. A vending machine, comprising, a face member having a delivery mouth, a gate reciprocable vertically in said face member having a hopper adapted to receive and hold an article to be dispensed when in superior position and to register with and release said article into said mouth when lowered, resilient means for returning the gate into superior position, a manual control for forcing the gate downwardly and when released permitting said resilient means returning the gate into superior position, a magazine for holding articles to be dispersed in proximity to said gate, an endless feed belt in the lower portion of and supported by the magazine adapted to engage and feed articles from the magazine into said hopper, and ratchet means connected with and operated by the movement of said gate for actuating said belt whereby a single article from the magazine is fed into said hopper upon each return of the gate to superior position.

5. A vending machine, comprising, a face member having a delivery mouth, a gate reciprocable vertically in said face member having a hopper adapted to receive and hold an article to be dispensed when in superior position and to register with and release said article into said mouth when lowered, a manual control for depressing said gate, means for returning said gate to superior position, a magazine for holding articles to be dispensed in proximity to said gate, an endless belt associated with and supported by said magazine having propelling blades adapted to engage and feed articles from the magazine into said hopper, spacers for holding tiers of articles to be vended in said magazine, said spacers being arranged in pairs and the members of each pair being adjustable apart to accommodate articles to be dispensed of different widths, and means actuated by said manual control for causing the movement of said belt whereby a single article is delivered from the magazine into said hopper each time said gate returns to superior position.

6. A vending machine, comprising, a face member having a delivery mouth, a gate reciprocable vertically in said face member having a hopper adapted to reciprocate and hold an article to be dispensed when in superior position and to register with and release said article into said mouth when lowered, a manual control for depressing said gate, means for returning said gate to superior position, a magazine for holding articles to be dispensed in proximity to said gate, said magazine being adjustable in width to accommodate articles to be dispensed varying in length, an endless belt in the lower portion of and supported by said magazine having propelling blades adapted to engage and feed articles from the magazine into said hopper, and means actuated by said manual control for causing the movement of said belt whereby a single article is delivered from the magazine into said hopper each time said gate returns to superior position.

7. A vending machine, comprising, a face member, having a delivery mouth, a gate reciprocable up and down in said face member having a hopper adapted to receive and hold an article to be dispensed when in superior position and to register with and release said article into said mouth when lowered, a manual control for depressing said gate, means for returning said gate to superior position, a magazine for holding articles to be dispensed in proximity to said gate, said magazine having upper and lower frames, each frame being extensible in width, vertical spacers connected with said frame and adjustable apart to accommodate articles to be vended varying in width, an endless belt in said magazine having propelling blades adapted to engage and feed articles from the magazine into said hopper, and means actuated by said manual control for causing the movement of said belt whereby a single article is delivered from the magazine into said hopper each time said gate returns to superior position.

8. A vending machine, comprising, a face member having a delivery mouth, a gate reciprocable up and down in said face member having a hopper adapted to receive and hold an article to be dispensed when in superior position and to register with said mouth and release said article thereinto when lowered, a manual control for depressing said gate, spring propelling means released by said manual control for returning said gate to superior position, a supporting frame, a magazine supported by said frame for normally holding articles to be dispensed from its lower portion to said gate, and an endless belt supported by said frame adjacent to the lower portion of said magazine having propelling elements adapted to engage and feed articles successively from the lower portion of the magazine into said hopper, said belt and manual control being interconnected for joint action whereby said belt is stepped forwardly during each return movement of the manual control to deliver an article from said magazine into said hopper, and said magazine being removable from said frame to permit loading with articles to be dispensed while away from said machine.

9. A vending machine, comprising, a face member having a delivery mouth, a gate reciprocable up and down in said face member having a hopper adapted to receive and hold an article to be dispensed when in superior position and to register with said mouth and release said article thereinto when lowered, a manual control for depressing said gate, spring controlled stop means associated with said manual control for checking intermediate reversal of the manual control except following each complete forward or backward stroke thereof, a supporting frame, a magazine supported by said frame for holding articles to be dispensed having an open lower portion coinciding with said gate, an endless feed belt supported by said frame adjacent to the lower portion of said magazine having propelling elements adapted to engage and feed an article at a time from the lower portion of the magazine into the hopper each return movement of said gate to superior position, spring propelling means interconnected between the manual control and feed belt for joint action and released during the return movement of said manual control for causing forward movement of said feed belt a step whereby a single article is delivered from the magazine into said hopper each time said gate is actuated, and stop means for retaining articles delivered by the feed belt from entering said hopper until said gate returns to superior position.

10. In a structure as defined in claim 8, the magazine being slidable horizontally in said frame to permit removal laterally for reloading the magazine with articles away from the machine.

CHARLES F. PEASE.